INVENTOR
JOHN E. MEGGITT
BY J. W. Armbruster
ATTORNEY

United States Patent Office 3,162,837
Patented Dec. 22, 1964

3,162,837

ERROR CORRECTING CODE DEVICE WITH MODULO-2 ADDER AND FEEDBACK MEANS

John E. Meggitt, Winchester, England, assignor to International Business Machines Corporation, New York, N.Y., a corporation of New York Filed Oct. 26, 1960, Ser. No. 65,126
Claims priority, application Great Britain Nov. 13, 1959
27 Claims. (Cl. 340—146.1)

This invention relates generally to data transmission systems, and particularly to such systems embodying error detecting and correcting means.

In data transmission systems that are subject to noise, it is found that errors do not occur randomly but in bursts. Consequently it is advantageous to center attention on the problem of constructing suitable error correcting codes.

In most of the codes disclosed heretofore, difficulties have occurred with their implementation, because different courses of action have to be followed by their decoders, depending on the nature of the error burst that is detected, and this has made their implementation such as to call for expensive and numerous elements of equipment. It is an object of the present invention to provide data transmission systems in which such difficulties are substantially minimized.

An example of an error correcting system known in the prior art is represented by the system disclosed by Hamming et al. in U.S. Reissue 23,601 (U.S. 2,552,629). The theory of the Hamming code for single error correction may be readily understood by noting that if a code group of 7 bit positions is assumed, four bits represent data and three following bits represent parity bit positions. Each parity bit checks different combinations of bit positions and together all parity bits constitute a locator subword (parity subgroup). The obtaining of different locator subwords for indicating the bit position where a single error occurs is the basic concept on which the Hamming error-correcting system is based.

The prior art also discloses an arrangement for correcting single errors and double adjacent errors. A description of this code may be found in Technical Report No. 51, dated December 30, 1958, by N. M. Abramson, entitled "A Class of Systematic Codes for Non-Independent Errors," published by Stanford University, Stanford, California. In this report a parity check code is illustrated employing a code group of 7 bit positions consisting of 4 parity bit positions and 3 data bit positions.

The main distinguishing feature between the Abramson parity check code and that disclosed by Hamming is that the bit positions checked by each parity bit in the Hamming table are arranged arbitrarily after two conditions are met. As explained by Hamming, the parity check code for a single error correcting system satisfies two conditions. The first is that each bit position of the code group must be in a locator subword. The second condition is that each bit position must have a different combination of parity bits. A different way of stating the second condition is that the locator subword for each bit position of the code group must be different.

In the parity check code disclosed by Abramson, the two conditions of the Hamming parity check table are met, but a third condition must also be satisfied. This third condition is that the bit positions checked by a parity bit are determined in accordance with an M-sequence. The term M-sequence is known in the art and may be defined by the output signal of one stage of a maximal length binary shift register having R stages. An M-sequence is merely a unique series of 0's and 1's of $2^R-1$ binary digits arranged in a predetermined order. A true M-sequence satisfies the condition that:

$$a_{t+R}=\sum_{j=1}^{R} C_j a_{t+(j-1)} \qquad (1)$$

where $2^R-1$ is the number of binary digits in the sequence before it repeats itself. The above equation may also be expressed as $$a_{t+R}=C_1a_t+C_2+a_{t+1}+C_3a_{t+2}+C_Ra_{t+R-1} \qquad (2)$$

where $C_1$—$C_R$ each represent a binary coefficient 0 or 1 determined from reference tables referred to as a "Table of Irreducible Poly-nominals Over Galois Field (2) Through Degree 19," by R. W. Marsh, a publication of the National Security Agency, dated October 24, 1957. Coefficients $C_1$—$C_R$ in effect determine the feedback path of the maximinal length binary shift register.

The present invention is directed to the detection, location and correction of multiple related errors. A group of different type errors are considered related if each of the errors results from the same error producing condition. For example, a noise burst signal which is 3 bit positions wide can cause four different types of related errors depending upon the value of the information bits subjected to the noise burst signal. For instance, if the values of the information bits affected are 000, respectively, it will be seen that a triple adjacent error 111 will result. Similarly, if the information bits affected are 100 a double adjacent error results. The noise burst signal causes each bit position which has a 0 value to change to a 1. It will therefore be seen that a noise burst signal 3 bit positions wide can produce the following four types of related errors; a single error (1); a double adjacent error (11); a double nonadjacent error (101); and a triple adjacent error (111).

In a report "A New Group of Codes for Correction of Dependent Errors in Data Transmission," IBM Journal of Research and Development, vol. 4, No. 1, January 1960, pp. 58–65, Mr. C. M. Melas discusses codes which are extensions of Abramson's double adjacent error correction codes. Two maximal-length M sequences and an all-check parity bit are used by Melas. The present invention differs in utilizing a single non-maximal sequence instead of two M sequences and has the further advantage of placing all parity bits at the end of the data block, thus simplifying the encoding and correction implementation.

According to one embodiment of the invention there is provided a data transmission system comprising an encoder adapted to develop binary check digits from a series of binary data digits to be transmitted, and a decoder adapted to interpret said check digits. The encoder includes a serial shift register having a number of stages equal to the number of digits in said series, and connected to receive said data digits serially, a modulo two adder ("Exclusive OR" logic device) adapted to receive a plurality of inputs and to deliver a single output representing the modulo two sum of said inputs to said shift register, and feedback coupling means individually coupling the respective inputs of said adder with stages of said shift register selected in accordance with rules determined by the characteristic equation of the code as described hereinafter.

In another embodiment of the invention, the encoder includes a shift register having a number of stages equal to the number of check digits to be developed, a modulo two adder connected to deliver the modulo two sum of a plurality of inputs to the input of said shift register and coupling means individually coupling the respective inputs of the adder with stages of the shift register selected in accordance with rules described herein, the setting of the various stages of the shift register being used to determine the check digits to be added to the series of data digits.

The decoder system consists of a buffer, an error pattern register with modulo two feedback connections, one or more registers consisting of prescribed error patterns and a correction station. The information digits usually precede the check digits during transmission and they enter the decoder buffer serially. As the parity check digits enter the buffer, the parity checks are again formed and added to the previously formed check digits in a modulo two adder and shifted into an error pattern shift register to be compared with the correctable error patterns determined by the capabilities of the general code. When the error pattern is found, correction takes place via a modulo two adder.

A significant contribution of this method of implementation stems from the fact that only the data bits are corrected and not the check bits, thereby allowing continual reading into the buffer.

A preferred form of decoder includes an additional shift register adapted to receive the data digits together with the check digits, adding means adapted to develop a modulo two sum of digits appearing in selected stages of said shift register, detecting means responsive to successive values of said sum, and inverting means connected to receive the output of said shift register and adapted to modify such output whenever said detecting means detects one of a predetermined series of conditions.

As a further modification of the invention it is disclosed that in the case of both encoder and decoder the input line with serial pulse information may be connected directly to the adder rather than first to the shift register. In other words, from the line, the pulses are first entered into the modulo 2 adder which in turn is connected to the input of the shift register from which feedback connections are directed back into the adder. In the case of an encoder, a plurality of switches may be employed, the first of which would first direct data digits into the adder and then open while another switch later connects the adder to the line so that check digits formed by the shift register and adder at successive steps are fed into the output line.

The foregoing and other objects, features and advantages of the invention will be apparent from the following more particular description of preferred embodiments of the invention, as illustrated in the accompanying drawings.

Figure 1:
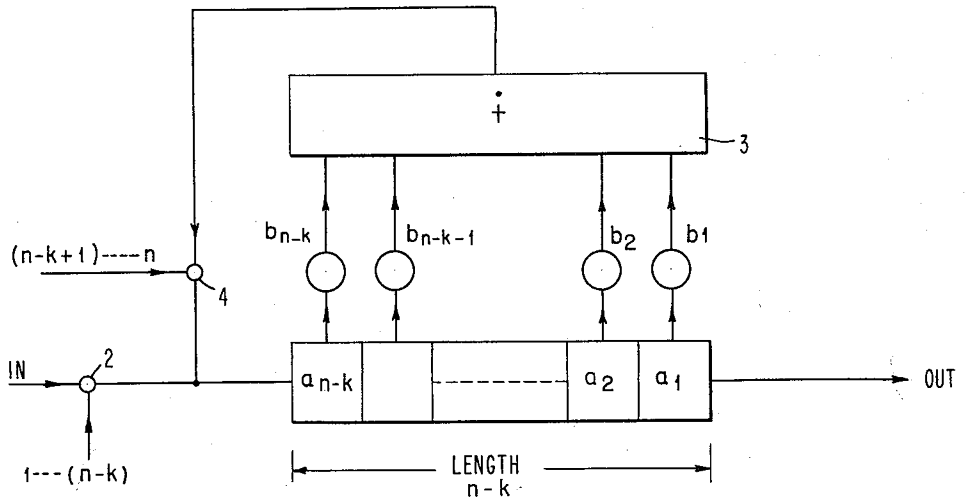
FIG. 1 shows one form of encoder embodying the invention.

Examples of "Exclusive OR" and modulo 2 adders are shown in U.S. Patents Haynes Reissue 24,614 and Fleisher 2,850,647.

Shift Registers are generally of the type of devices shown in Official U.S. Patent Class 235, subclass 165, and a representative patent is that of Harper 2,580,771.

Matrix theory is set forth fully in "Basic Theorems in Matrix Theory," by M. Marcus, National Bureau of Standards, Applied Mathematics Series #57 and the references cited therein.

All of the embodiments of the invention to be described hereinafter use fed-back shifting registers in conjunction with modulo two adders and it is felt that a discussion of such registers will be of value in understanding the invention.

Fed-back shifting registers whose logic contains only modulo two adders, are conveniently described in terms of matrices. If the contents of a shifting register are represented by the $k \times 1$ vector $\underline{x}$, it is convenient to denote the contents after a shift by $$\underline{Tx} \qquad (1)$$

where $\underline{T}$ is a $k \times x$ matrix all of whose elements are 0 or 1.

The behaviour of such a shifting register is determined by the characteristic equation of degree $k$, that $\underline{T}$ satisfies.

$$F(T)=0 \qquad (2)$$

By a suitable choice of $F(\underline{T})$, it is possible to make the successive contents of the register take $2^k-1$ different values.

Such a characteristic equation will be denoted by $$M(k\underline{T})=0 \qquad (3)$$

Codes for correcting bursts of errors may be constructed in terms of these matrices $\underline{T}$.

Because the feedback connections between the shift register or buffer of the encoder and decoder and the related modulo 2 adder are variable, i.e., each one is subject to connection or disconnection as being pluggable into or out of play, it is possible to follow the matrix pattern of any predetermined code, or to evolve a code determined by the selected arrangement.

APPLICATION TO CODES

In the class of codes to be considered, data is transmitted in blocks of $n$ binary digits. In each block there are $n-k$ information digits and $k$ check digits, and as each block is received, error correction is carried out.

If the digits in the block are $a_1 \ldots a_n$ then the class of codes to be considered is defined by the equation $$a_1\underline{x}+a_2\underline{T}\underline{x}+a_3\underline{T}^2\underline{x}+ \ldots +a_n\underline{T}^{n-1}\underline{x}=0 \qquad (4)$$

where $\underline{T}$ is a matrix such as has just been described and $n$ is such that $\underline{T}^n=1$. These $k$ linear equations define $k$ of the $a$'s in terms of the other $n-k$, and these are taken to be the check digits. To correct such a message, the error vector Z is calculated:

$$Z=a_1\underline{x}+a_2T\underline{x}+a_3T^2\underline{x} \ldots +a_nT^{n-1}\underline{X}$$

The errors which such codes will correct, and the values of $n$ for given $k$, are all determined by the characteristic equation that T satisfies and depend on nothing else.

EXAMPLES OF CODES DESCRIBED BY CHARACTERISTIC EQUATIONS (i) If $\underline{T}$ is chosen to satisfy $$M(K\underline{T})=0 \qquad (5)$$

then the codes defined by (4) are clearly such that single error correction is possible and $n=2^K-1$. This gives a set of codes first noted by Abramson as indicated hereinbefore.

(ii) If to the $k$ equations defining the codes (i), a total parity check equation is added, then it may be seen that double adjacent error correction is also possible. This leads to a $\underline{T}$ which satisfies the equation $$(\underline{T}+1)M(k\underline{T})=0 \qquad (6)$$

and $n=2^K-1$.

(iii) The codes (ii) may in turn be extended by using a $\underline{T}$ which satisfies the equation $$M1(k_1\underline{T})M_2(k2\underline{T})=0 \qquad (7)$$

where $k_1$ and $k_2$ are such that $2^{k}2-1$ is a factor of $2^{k}1-1$. It is then found that $n=2^{k}1$. This set of codes is capable of correcting bursts of errors of various forms.

(iv) A further group of codes is based on the equation $$(T^k+1)M(k_2\underline{T})=0 \qquad (8)$$

where $k_1$ is chosen to be prime of $2^{K_2}-1$. In that case $n=k_1(2^{K_2}-1)$. This code too is good for correcting bursts of errors and rules can be given for the bursts it will correct.

*Example.*—When $k_1=5$, errors of the form 1, 11, 101, 111, 1011, 1111 can all be corrected.

TRANSFORMATIONS

It is apparent therefore, that many useful codes are specified in terms of their matrix characteristic equations and as has been remarked, these equations completely determine their properties. Hence sets of many apparently different codes, all with the same properties, can be constructed by using different matrices $\underline{T}$, as long as all of them satisfy the same characteristic equation. Some of these codes have been described in the prior art, but their implementation has involved complicated circuitry.

I have found a general procedure for implementing any code whose characteristic equation is given, and this will now be described.

The general characteristic equation has the form $$\underline{T}^k+C_{k-1}\underline{T}^{k-1}+C_{k-2}\underline{T}^{k-2}+\ \dots\ +C_1\underline{T}+C_0=0 \qquad (9)$$

where the C's are 0 or 1. A convenient matrix that satisfies this equation is the associated matrix.

$$\underline{T}=\begin{pmatrix} C_{k-1} & C_{k-2} & C_{k-3}\text{------------}C_1 & C_0 \\ 1 & 0 & 0\text{------------}0 & 0 \\ 0 & 1 & 0\text{------------}0 & 0 \\ 0 & 0 & 1\text{------------} & \cdot \\ \cdot & \cdot & \cdot\text{------------} & \cdot \\ \cdot & \cdot & \cdot\text{------------} & \cdot \\ \cdot & \cdot & \cdot\text{------------}1 & 0 \end{pmatrix} \qquad (10)$$

The vector $\underline{x}$ of Equation 4 can be chosen arbitrarily provided it is such that $$F(\underline{T})\underline{x}\neq 0 \qquad (11)$$

for any polynomial F of degree less than K. This may be insured by taking $$\underline{x}=\begin{pmatrix} 1 \\ 0 \\ 0 \\ \cdot \\ \cdot \\ \cdot \\ 0 \end{pmatrix} \qquad (12)$$

as may easily be proved.

*Example.*—Consider the code for $n=7$ based on the equation $$(T+1)(T^3+T+1)=0 \qquad (13)$$

This code corrects single errors and double adjacent errors. One of the possible transformed versions of it is obtained by using the $\underline{T}$ of Equation 10. The coding equations then become from (4)

$$\begin{array}{cccccccc} & 1 & 1 & 0 & 1 & 0 & 0 & 0 \\ 1 & 0+a_2 & 1+a_3 & 1+a_4 & 0+a_5 & 1+a_6 & 0+a_7 & 0=0 \\ & 0 & 0 & 1 & 1 & 0 & 1 & 0 \\ & 0 & 0 & 0 & 1 & 1 & 0 & 1 \end{array} \qquad (14)$$

*Implementation*

When the C's are given, as they are when the characteristic equation is known, I is taken to be the matrix.

$$\underline{T}=\begin{pmatrix} C_{k-1} & C_{k-2} & C_{k-3}\text{------------}C_1 & 1 \\ 1 & 0 & 0\ \text{------------}0 & 0 \\ 0 & 1 & 0\ \text{------------}0 & 0 \\ 0 & 0 & 1\ \text{------------}0 & 0 \\ \cdot & \cdot & \cdot\ \text{------------} & \cdot \\ \cdot & \cdot & \cdot\ \text{------------} & \cdot \\ 0 & 0 & 0\ \text{------------}1 & 0 \end{pmatrix} \qquad (1)$$

$\underline{x}$ is taken to be the vector $$\underline{x}=\begin{pmatrix} 1 \\ 0 \\ 0 \\ \cdot \\ \cdot \\ 0 \end{pmatrix} \qquad (2)$$

It will be found that the parity equations take the form $$a_{n-k+1}+\sum_{j=1}^{n-k} b_j \quad a_j=0$$

$$a_{n-k+2}+\sum_{j=1}^{n-k} b_j \quad a_j+1=0 \qquad (3)$$

$$a_n+\sum_{j=1}^{n-k} b_j \quad a_{j+k-1}=0$$

where the *b*'s take the values 0 or 1.

The digits $a_{n-k+1}\ \dots\ a_n$ are chosen as the check digits while the digits $a_1\ \dots\ a_{n-k}$ are chosen to be the information digits. Digits are transmitted serially in order starting with $a_1$.

Figure 2:
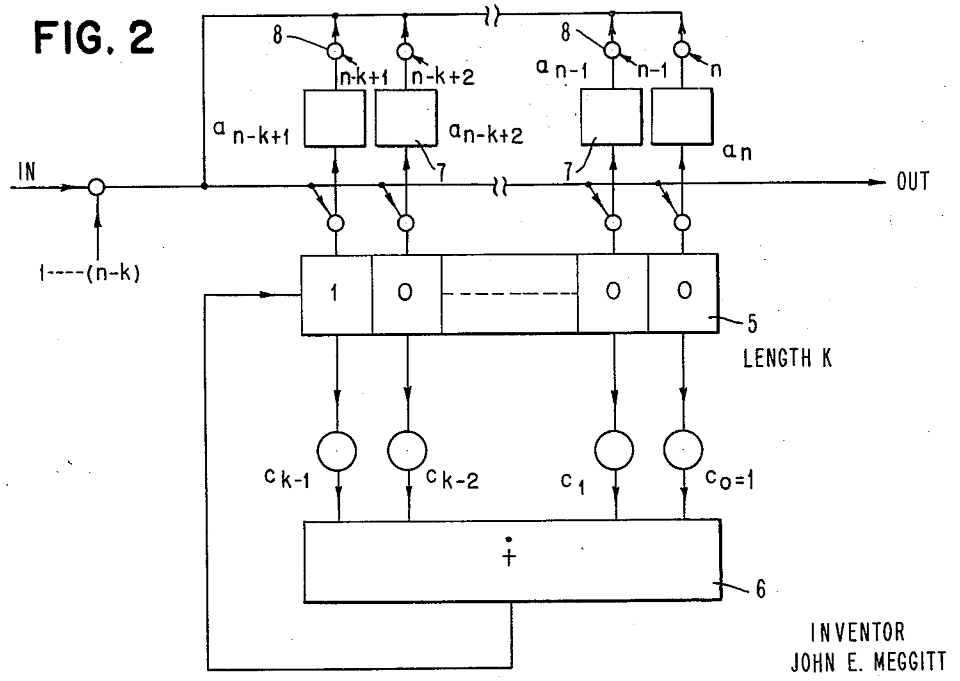
FIG. 2 shows an alternative encoder embodying the invention.

An encoder which imposes the conditions (5), is shown in FIG. 1. An alternative arrangement is shown in FIG. 2.

Figure 3:
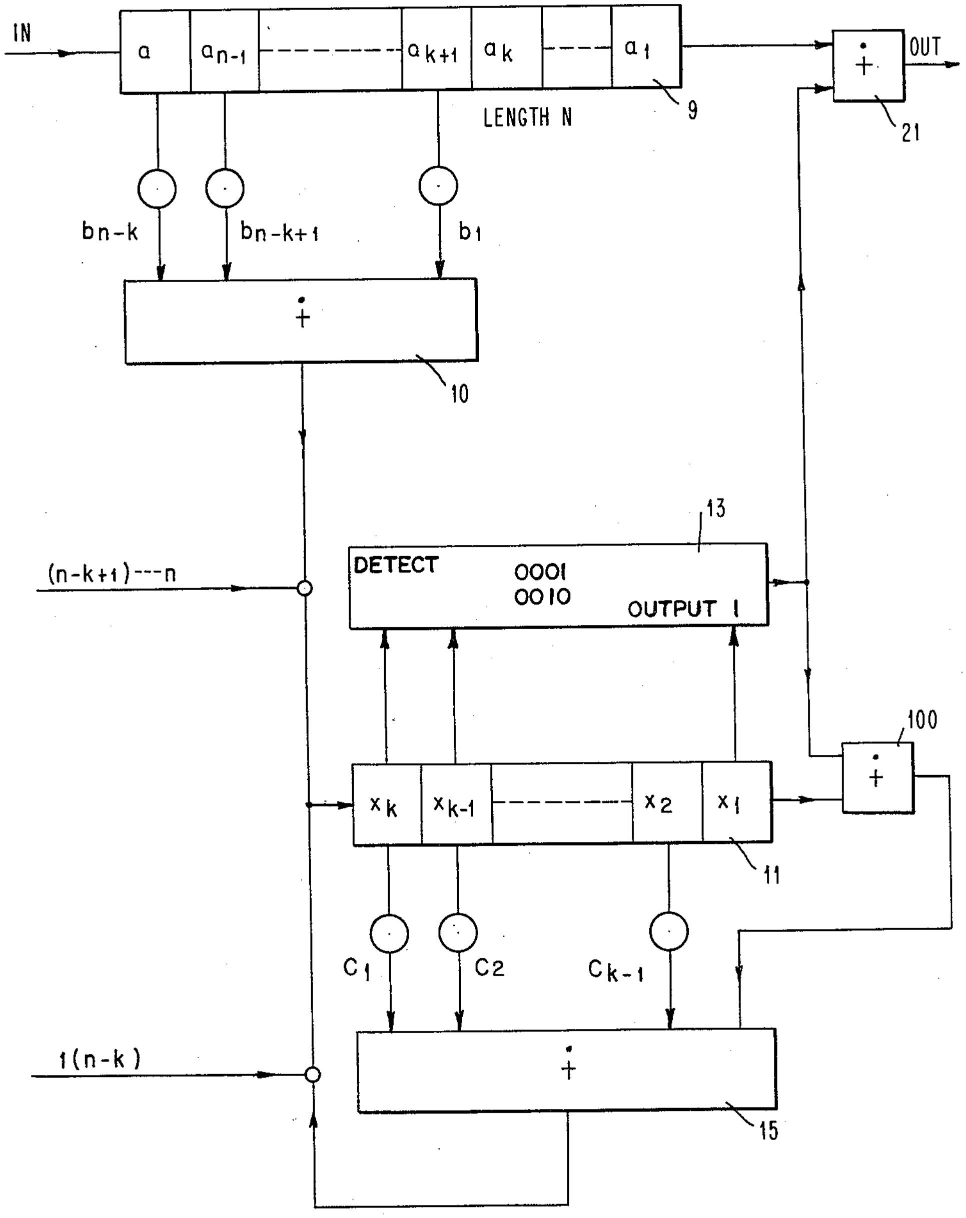
FIG. 3 shows a decoder embodying the invention.

A decoder is shown in FIG. 3. It is clear that though the decoder shown has incorporated in it a check arrangement like the encoder in FIG. 1, an alternative design is possible with a check arrangement like that in FIG. 2.

Referring now to FIG. 1, there is shown an encoder suitable for the implementation of any one of the codes developed generally above. The encoder includes a multistage shifting register 1, arranged to receive the information to be transmitted through a gate 2. It is assumed that a serial train or data block of information $n-k$ digits long is to be transmitted, and that $k$ check digits are to be developed. Gate 2 is arranged to be open during the time the data block is being supplied to the encoder, i.e., between times $t=l$ and $t=n-k$, and closed at all other times. A modulo two adder 3 is arranged to receive inputs from selected stages of the shifting register and to feed a modulo 2 sum of the inputs back to the shifting register through a gate 4, which is open from time $n-k+1$ to time $n$.

As shown in the drawing FIG. 1, each stage of the shifting register 1 is coupled to an input of the modulo two adder 3 through a coupling denoted by a circle having a reference character $b_{n-k}\ \dots\ b_1$. These circles are to be interpreted as a connection if the corresponding $b$ coefficient, as derived above, is unity, and an open circuit if the $b$ coefficient is zero.

In operation, data flows into the shifting register at times $1\ \dots\ n-k$, while check digits are fed successively to the register input at times $n-k+1\ \dots\ n$. The configuration shown is that occurring at time $n-k+1$ when the first check digit is being calculated and will occupy the space shown occupied by $a_{n-k}$ when the register is shifted. There appears at the output of the shift register 1 a train of data digits immediately followed by a train of check digits developed in accordance with the rules outlined above.

The alternative encoder shown in FIG. 2 is somewhat similar to that shown in FIG. 1, but it would probably show an economy in hardware when long data blocks are to be transmitted. This embodiment also includes a shifting register 5 having feedback connections through a modulo two adder 6, inputs of the modulo two adder being connected to selected stages of the shift register by couplings again indicated by circles, which this time denotes a connection or an open circuit according to whether the corresponding C coefficient, as derived above, is unity or zero respectively.

The shift register 5 has a number of stages equal to the number of check digits to be developed, i.e., of length K, and the settings of the various stages of the register are used to gate the check digits to the line in the following manner. The stages of the shifting register 5 take up at successive times the settings $\underline{x}\underline{T}\underline{x}\ \dots\ \underline{T}^{n-1}\underline{x}$, starting as shown with $\underline{x}=(1000\ \dots\ 0)$. These settings are used to steer information into a series of flip-flops 7, where the check digits are formed. At the appropriate times the check digits are read out onto the line through a series of gates 8.

Referring now to FIG. 3, there is shown a decoder adapted to detect certain classes of error bursts in the received block of data, and to apply the appropriate corrections.

The decoder shown in FIG. 3 comprises a main buffer or shifting register 9 having associated therewith a modulo two adder 10 connected to evaluate the parity equations, the connections between the stages of the shifting register 9 and the adder being through couplings shown as circles $b_{n-k}$, etc. and performing identical functions to those couplings $b$ shown in the encoder of FIG. 1. The output of the adder 10 is connected to a K-stage shifting register 11 having a feedback path including a modulo two adder 15 connected to selected stages of the shifting register 11, in a manner similar to the interconnection of the shifting register and adder of the encoder of FIG. 2. The stages of the register 11 are arranged to be monitored by a detector 13, which is adapted to detect certain patterns stored in the register 11 and to emit a pulse when such a pattern is detected.

The code is designed to correct certain bursts of faults. If one of the bursts it is designed to correct has the form $$\bar{0}, q_1, q_2 \ldots q_r, \bar{0}$$

then we define $$\begin{pmatrix} Ui_1 \\ Ui_2 \\ \cdot \\ \cdot \\ \cdot \\ Ui_k \end{pmatrix} = q_1 + q_2\underline{T} + q_3\underline{T}^2 \ldots q_r\underline{T}^{n-1} \begin{pmatrix} 1 \\ 0 \\ \cdot \\ \cdot \\ \cdot \\ 0 \end{pmatrix}$$

and the detector is arranged to detect patterns of the form $$\begin{pmatrix} X_1 \\ X_2 \\ \cdot \\ \cdot \\ \cdot \\ X_k \end{pmatrix} = \begin{pmatrix} Ui_1 \\ Ui_2 \\ \cdot \\ \cdot \\ \cdot \\ Ui_k \end{pmatrix}$$

The operation of the decoder is first to calculate the $kx$'s defined by $$A'_{n-k+1} + \sum_{j=1}^{n-k} b_j a_j = X_1$$

$$A'_n + \sum_{j=1}^{n-k} b_j a_{j+k-1} = X_k$$

where the $a$'s are the received digits. If no errors have occurred then all the $x$'s are zero and no correction is required. On the other hand, if the $x$'s are not all zero, then their pattern indicates the nature and position of the errors. This calculation is carried out in a modulo two adder 10.

As the $x$'s are calculated, they are fed to a shifting register 11. The decoder is shown at time $n+1$ (which is the same as time 1), when all the transmitted digits occupy the main shifting register 9 while the $kx$'s occupy the lower shifting register 11. Henceforth, until time $n-k+1$, the lower shifting register 11 is fed back so that the contents are continually changing, while simultaneously, information leaves the main register 9. As this happens, detection circuit 13 looks for coincidences, and when coincidences are found, the digit currently being delivered from the end of the main register 9 is inverted and the setting of the shift register is altered to indicate that the burst pattern now to be corrected is a simpler one, since the first digit has already been corrected. This is achieved by sending a pulse from the detector circuit to the adder 10 to be fed back to the register 11.

*Theory of Decoder*

Suppose a fault of the form $\underline{0}q_1 \ldots q_r\ 0(q_1=1)$ occurs with the first digit wrong being $a_p$.

Then $$\begin{pmatrix} X_1 \\ X_2 \\ \cdot \\ \cdot \\ \cdot \\ X_k \end{pmatrix} = \underline{T}^{p-}(1 + g_2\underline{T} + g_3\underline{T}^2 + \ldots + g_r\underline{T}^{r-1}) \begin{pmatrix} 1 \\ 0 \\ \cdot \\ \cdot \\ \cdot \\ 0 \end{pmatrix}$$

The operation of the shifting register is to replace.

$$\begin{pmatrix} X_1 \\ \cdot \\ \cdot \\ \cdot \\ X_k \end{pmatrix} \text{ by } \begin{pmatrix} Y_1 \\ \cdot \\ \cdot \\ \cdot \\ Y_k \end{pmatrix} = \underline{T}^{-1} \begin{pmatrix} X_1 \\ \cdot \\ \cdot \\ \cdot \\ X_k \end{pmatrix}$$

Hence after the $p$ operations, the contents of the shifting register are $$\begin{pmatrix} Y_1 \\ Y_2 \\ \cdot \\ \cdot \\ \cdot \\ Y_k \end{pmatrix} = (1 + g_2\underline{T} + \ldots + g_r T^{r-1}) \begin{pmatrix} 1 \\ 0 \\ \cdot \\ \cdot \\ \cdot \\ 0 \end{pmatrix}$$

This, by design is detected by the coincidence circuits. Now at this time $a$ is being output from the end of the main shifting register, and so it will be inverted as we expect.

Further $$\begin{pmatrix} 1 \\ 0 \\ \cdot \\ \cdot \\ \cdot \\ 0 \end{pmatrix}$$

is now added to $$\begin{pmatrix} Y_1 \\ Y_2 \\ \cdot \\ \cdot \\ \cdot \\ Y_k \end{pmatrix}$$

so that at the next time, $$\begin{pmatrix} Y_1 \\ Y_2 \\ \cdot \\ \cdot \\ \cdot \\ Y_k \end{pmatrix} = (q_2 + q_r\underline{T} + \ldots q_r T^{r-2}) \begin{pmatrix} 1 \\ 0 \\ \cdot \\ \cdot \\ \cdot \\ 0 \end{pmatrix}$$

This situation is now exactly as though the original burst was $\underline{0}q2 \ldots qr\underline{0}$, with the first mistake occurring in $a_{r+1}$ and the correction process just described will repeat itself.

*Example.*—Assume that we have the following three bit message namely 101 or $a_1=1$ then $a_4=1\dotplus 0=1$ $a_2=0$ $\quad a_5=0\dotplus 1=1$ $a_3=1$ $\quad a_6=1\dotplus 1=0$ $\quad a_7=1\dotplus 1=0$

| $a_7$ | $a_6$ | $a_5$ | $a_4$ | $a_3$ | $a_2$ | $a_1$ | |
|---|---|---|---|---|---|---|---|
| 0 | 0 | 1 | 1 | 1 | 0 | 1 | ENCODED MESSAGE |

Now assume a single error occurs in the $a_3$ digit during transmission such that entering the decoder we have—

0 0 1 1 0 0 1 ($x$ indicates the position in error)

$x$

| $a_7$ | $a_6$ | $a_5$ | $a_4$ | $a_3$ | $a_2$ | $a_1$ |
|---|---|---|---|---|---|---|
| 0 | 0 | 1 | 1 | 0 | 0 | 1 |

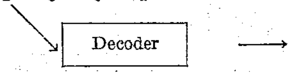

$Z_1=1\dotplus 0\dotplus 1=1$
$Z_2=0\dotplus 0\dotplus 1=1$
$Z_3=0\dotplus 1\dotplus 0=1$
$Z_4=1\dotplus 1\dotplus 0=0$ The initial contents of the error pattern register 11 (FIG. 3) after all seven digit bits of the coded message have been read into buffer 9 is now 0110.

The next step is to shift the register 11 right one position and read one data bit serially from the buffer 9 through the corrector station to the final output receiver. This shifting of the register 11 (with feedback) can be best illustrated by a shift table. The first entry is the 0110 which was computed during the reading into the buffer.

| Stage of Shifting | Contents of Register 11 | Bit Leaving Buffer 9 | Prescribed error pattern |
|---|---|---|---|
| 0 | 0110 | none | 0 0 0 1    0 0 1 0 |
| 1 | 0011 | 1 | ⊕ ⊕ ⊕[3] ⊕    ⊕ ⊕ ⊕ ⊕ |
| 2 | 0001 | [2] 0 | 0 0 0 1 |
| 3 | [1] 0000 | 0 $x$ | |

[1] Note: At the same time we cleared the error pattern register 11.
[2] Stage at which we detect a single error.
[3] Match.

In this example a match was sensed after one shift. The output to the single "Exclusive Or" corrector 21 is taken from the prescribed error pattern register 13. The next bit to pass the correcting station is complemented or corrected.

*Example.*—(Double Adjacent Error Case) Using the same example as before, consider A Double Error in the received digits, $a_2$ and $a_3$ such that we have:

| | $a_7$ | $a_6$ | $a_5$ | $a_4$ | $a_3$ | $a_2$ | $a_1$ |
|---|---|---|---|---|---|---|---|
| Received Sequence | 0 | 0 | 1 | 1 | 0 $x$ | 1 $x$ | 1 |

The initial contents of the error pattern register 11 is 0101 corresponding to $Z_1$ and $Z_3$ failing.

Now constructing a shift table it is seen that a match is received between 0010 and the contents of the register 11 after only one shift and therefore it is necessary to correct the current bit passing by the corrector station.

| Stage of Shifting | Contents of Register 11 | Bit Leaving Buffer 9 | |
|---|---|---|---|
| 0 | 0101 | none | |
| 1 | 0010 | 1 | 1st match. |
| 2 | 0001 | 1 $x$ | 2nd match. |
| 3 | 0000 | 0 $x$ | Cleared register 11. |

Secondly, we see that the register 11 is not cleared and with the next shift a second match is obtained. This calls for correction of the $a_3$ bit which was also corrupted. It may be noted that the one bit being shifted off the end of the error pattern register 11 and the one bit leaving the prescribed error pattern station to the corrector station 21 also combine to block any feedback in the register 11 and it is cleared to all zeros.

As a modification of the invention it is disclosed in FIGS. 4–8, that the serially entered pulse information may be sent directly to the adder rather than first to the buffer or shift register. This is so that from the line the pulses are first entered into the modulo 2 adder which in turn is connected to the input of the shift register from which feed back connections are directed back into the adder. In the case of an encoder, a plurality of switches may be employed between the several units to gate the pulses into and out of the adder, buffer and shift register.

It is noted hereinbefore, FIGS. 1, 2 and 3, that input was to the registers 1, 5 and 9, respectively, while feedback was had with modulo 2 adders 3, 6 and 10 respectively. Now with reference to the general and particular connections of FIGS. 4–8, it is seen that received information is fed straight from the transmission line to the adders 31–35, respectively, of the shifting registers 41–45, respectively.

Figure 4:
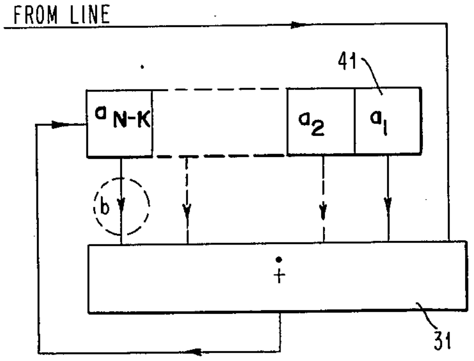
FIG. 4 shows a basic form of encoder or decoder assembly of adder and shift register of modified kind with direct adder connections.

Referring to FIG. 4 it may be assumed that an encoder register 41 is first arranged to contain zero. When the first digit $a_{1'}$ is received it will contain:

$$a_{1'}\underline{x}$$

when the second digit $a_{2'}$ is received it will contain:

$$a_{2'}\underline{x}+a_{1'}T^{-1}\underline{x}$$

When the third digit $a_{3'}$ is received it will contain:

$$a_{3'}\underline{x}+a_{2'}T^{-1}\underline{x}+a_{1'}T^{-2}\underline{x}\ \ldots$$

etc.

Eventually, it will contain $$\underline{z}=a_{1'}\underline{x}+a_{2'}\underline{Tx}+\ \ldots\ +a_{n'}\underline{T^{n}x}$$

as is required, since $T^{-n}=1$.

*Example of the Decoder*

Consider the code of 7 characters: 4 check and 3 information, which will allow the automatic correction of single and double adjacent errors and has the form:

$$a_4=a_1+a_2$$
$$a_5=a_2+a_3$$
$$a_6=a_3+a_4$$
$$a_7=a_4+a_5$$

It is necessary to calculate $$z_1=a_{1'}+a_{2'}+a_{4'}$$
$$z_2=a_{2'}+a_{3'}+a_{5'}$$
$$z_3=a_{3'}+a_{4'}+a_{6'}$$
$$z_4=a_{4'}+a_{5'}+a_{7'}$$

This is done as follows, with reference to FIG. 5 and an encoding register 42 according to the previous description.

The register takes the following sequence of values:

| | | | | |
|---|---|---|---|---|
| 1 | 0 | 0 | 0 | 0 |
| 2 | $a_{1'}$ | 0 | 0 | 0 |
| 3 | $a_{2'}$ | $a_{1'}$ | 0 | 0 |
| 4 | $a_{1'}+a_{3'}$ | $a_{2'}$ | $a_{1'}$ | 0 |
| 5 | $a_{1'}+a_{2'}+a_{4'}$ | $a_{1'}+a_{3'}$ | $a_{2'}$ | $a_{1'}$ |
| 6 | $a_{2'}+a_{3'}+a_{5'}$ | $a_{1'}+a_{2'}+a_{4'}$ | $a_{1'}+a_{3'}$ | $a_{2'}$ |
| 7 | $a_{3'}+a_{4'}+a_{6'}$ | $a_{2'}+a_{3'}+a_{5'}$ | $a_{1'}+a_{2'}+a_{4'}$ | $a_{1'}+a_{3'}$ |
| 8 | $(a_{4'}+a_{5'}+a_{7'})$ | $(a_{3'}+a_{4'}+a_{6'})$ | $(a_{2'}+a_{3'}+a_{5'})$ | $(a_{1'}+a_{2'}+a_{4'})$ |
| = | z4 | z3 | z2 | z1 |

as is required.

*An Encoder for the Same Problem*

The ideas previously described may be applied to the implementation of an encoder. The object is to define $k$ of the $a$'s in terms of the other $n-k$, where $$a_1\underline{x}+a_2\underline{Tx}+\ \ldots\ +a_n\underline{T}^{n-1}\underline{x}=0$$

Figures 6, 7:
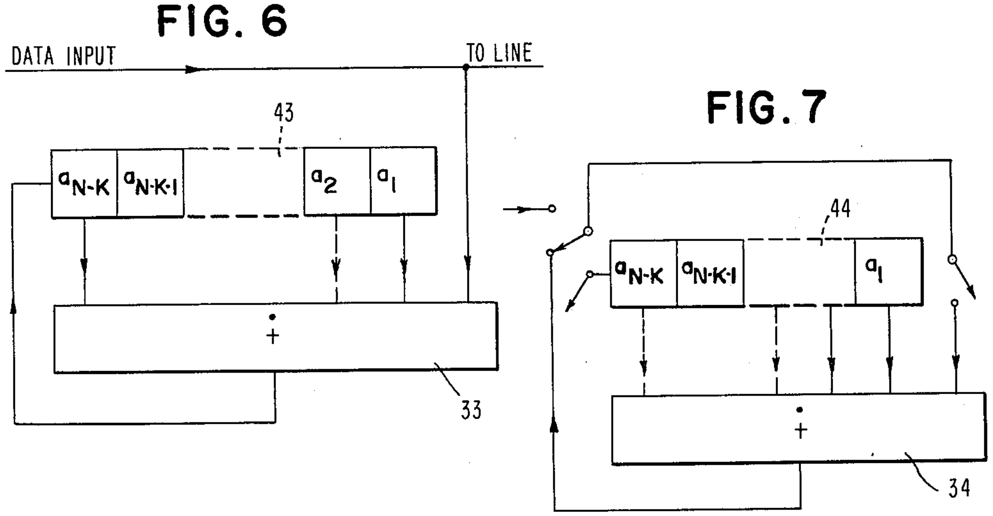
FIG. 6 shows an encoder of a general type using the principles shown in FIG. 4.
FIGS. 7 and 8 show encoders with switch arrangements.

The arrangement previously described is used at the times when information flows into the register of FIG. 6.

The check digits are formed at succeeding times and fed to the line by changing two connections as noted in FIG. 7.

*Example.*—The same example as before illusrates the method. It is required to form:

$$a_4=a_1+a_3$$
$$a_5=a_2+a_3$$
$$a_6=a_3+a_4$$
$$a_7=a_4+a_5$$

Figure 8:
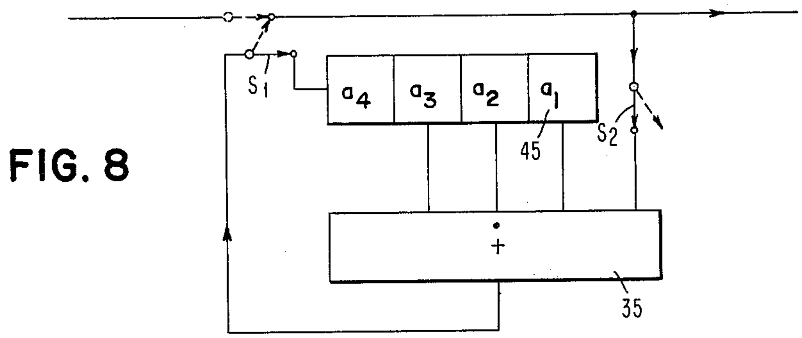

The contents of the register 45, FIG. 8 are successively:

| | | | | |
|---|---|---|---|---|
| 1 | 0 | 0 | 0 | 0 |
| 2 | $a_1$ | 0 | 0 | 0 |
| 3 | $a_2$ | $a_1$ | 0 | 0 |
| 4 | $a_1+a_3$ | $a_2$ | $a_1$ | 0 |

Feedback connection to shifting register broken.

| | | | | |
|---|---|---|---|---|
| 5 | 0 | $a_1+a_3$ | $a_2$ | $a_1$ |
| 6 | 0 | 0 | $a_1+a_3$ | $a_2$ |
| 7 | 0 | 0 | 0 | $a_1+a_3$ |

Output from adder $$a_1$$
$$a_2$$
$$a_1+a_3$$

Output fed to line at this point $$a_1+a_2\quad(=a_4)$$
$$a_2+a_3\quad(=a_5)$$
$$a_1+a_2+a_3=a_3+a_4\quad(=a_6)$$
$$a_1+a_3=a_4+a_5\quad(=a_7)$$

These ideas apply to binary fields, messages having symbols that take two values.

In one form of decoder embodying the invention, for handling binary signals, information signals are fed directly to a modulo 2 adder associated with the fed-back shifting register instead of being passed through a separate adder as noted hereinbefore. The connections between the shifting register and the adder are determined in the same way as in the aforesaid instance, as are the error-indicating patterns to be detected. It should be noted that the fed-back shifting register here performs two functions, the first being the assembly of error code patterns and the second being the presentation of these patterns for comparison with the contents of the detector. Clearly, while the register is performing the second function it is not available for the assembly of code patterns from the following block of information, and a speed loss is sustained. However, this loss may readily be eliminated by duplicating the shifting register, and using the two registers in tandem. Where all but the smallest blocks of data are to be handled, the cost of an extra shift register is small in comparison with that of the adder which it replaces.

In an encoder constructed in accordance with the invention, information digits are supplied directly to an adder associated with the fed-back shifting register of the encoder of the first embodiment, until all the information digits have been received, when both the input to the adder and the feedback connection of the register are broken. The output of the register is then sent in the train of the information digits.

One advantage of this modification lies in the reduction of the size and number of parts used. In the case of the encoders of FIGS. 4, 5, etc., the shift register need be only the length of the register portion for the check digits, i.e., four of seven stages as contrasted with the first encoders of FIGS. 1 and 2. With longer message groups this is even more advantageous as fifteen stages do for over a hundred data bit places thus omitted. The corresponding modulo 2 adder is also diminished in size.

As for decoders using the FIG. 4. etc. modification, there the saving is in omission of one modulo 2 adder. Some time is lost in not having a continuous flow of decoded data, but the advantage lies in use of less equipment.

The invention may be applied to data transmission systems handling data in fields other than the simple binary field. In such applications it may be necessary to include multiplying means in the feedback path of the shifting register. In an embodiment of the invention for handling data expressed in characters which can take one of four different values, one of the connections between the shift register and the adder includes means for effecting multiplication by the Galois Field element $b$ where $b$ is such that $b^2+b+1=0$.

In order that the invention may be well understood, various embodiments of the invention will now be described with reference to the accompanying drawings.

As noted hereinbefore:

where $$a_1\underline{x}+a_2\underline{Tx}+a_3\underline{T^2x}\ldots+a_nT^{n-1}\underline{x}=0$$

$$\underline{T}=\begin{array}{cccc} C_{k-1} & C_{k-2} & \ldots & C_0 \\ 1 & 0 & \ldots & 0 \\ 0 & 1 & \ldots & - \\ \vdots & & & \\ 0 & - & \ldots & 10 \end{array}$$

and $T^n=1$.

$\underline{x}$ is a vector $$\underline{x}=\begin{array}{c} 1 \\ 0 \\ 0 \\ \vdots \\ 0 \end{array}$$

$a_1$ to $a_n$ being the digits of the transmitted message, which, when received, may be different due to transmission errors, i.e. they may take the form $a_{1'}$ to $a_{n'}$. In order to correct the errors provided for, it is necessary to form $$\underline{z}=a_{1'}\underline{x}+a_{2'}\underline{Tx}+\ldots+a_{n'}\underline{T}^{n-1}\underline{x}$$

FIGURE 1 shows an arrangement for carrying out this operation in accordance with the invention. It is seen to consist simply of a shifting register 1 having those stages, when corresponding C coefficient (as derived in the manner already set out) is 1, connected to provide inputs to a modulo 2 adder 2, whose output is fed to the first stage of the shifting register. A further input of the adder is connected to receive coded information from the transmission line.

The register 1 is arranged initially to contain zero. When the first digit $a_{1'}$ is received, it will contain $$a_{1'}\underline{x}$$

When the second digit $a_{2'}$ is received, it will contain $$a_{2'}\underline{x}+a_1\underline{T}^{-1}\underline{x}$$

When the third digit $a_{3'}$ is received, it will contain $$a_{3'}\underline{x}+a_{2'}\underline{T}^{-1}\underline{x}+a_{1'}\underline{T}^{-2}\underline{x}$$

etc.

Eventually, it will contain $$\underline{z}=a_{1'}\underline{x}+a_{2'}\underline{Tx}+\ldots a_{n'}\underline{T}^{n}\underline{x}$$

as is required, since $T^{-n}=1$.

A number of examples of decoders embodying the invention will now be described.

Figure 9:
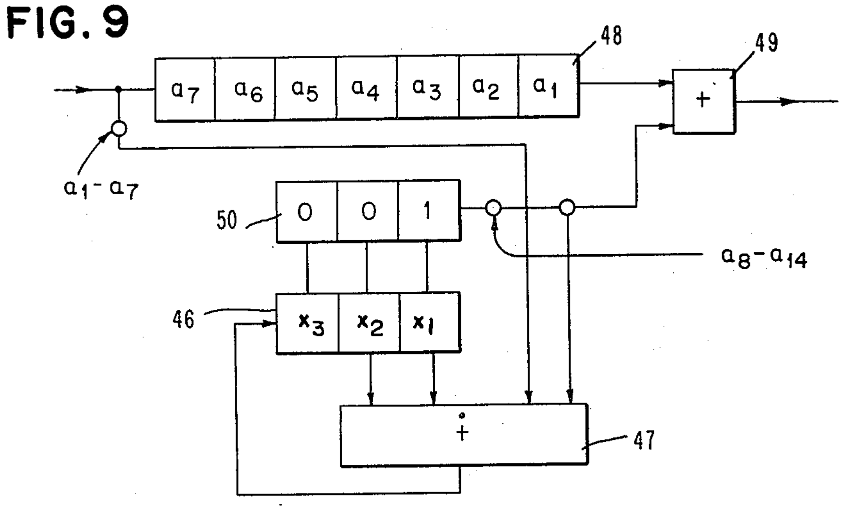
FIG. 9 shows a decoder arranged to correct single errors in a word of length 7.

Referring now to FIGURE 9, there is shown a decoder arranged to correct single errors in a word of length 7. A suitable characteristic equation for this application is given by $$T^3+T^2+1=0$$

giving four information digits and three check digits. The fed back shifting register will thus have three stages, of which the second and third will be coupled to the modulo 2 adder, since from the characteristic equation $C_2=1$ and $C_1=0$, these being respectively the coefficients of $T_2$ and T which, as shown, determine the connections between the register and the adder.

The decoder of FIGURE 9 is thus seen to comprise a three stage shifting register 46, the second and third stages of which are coupled to deliver inputs to a modulo 2 adder 47, which is also arranged to receive incoming information digits. The incoming digits are also fed to a seven stage shifting register 48, from which they pass to a modulo 2 adder 49, which is connected to receive error signals from an error pattern detector 50 arranged to monitor the contents of register 46.

Assuming that the incoming digits arrive in the sequence $a'_1a'_2\ldots a'_7$, the contents of register 46 will take up the following values in sequence:

| | | | |
|---|---|---|---|
| 1 | 0 | 0 | 0 |
| 2 | $a'_1$ | 0 | 0 |
| 3 | $a'_2$ | $a'_1$ | 0 |
| 4 | $a'_3+a'$ | $a'_2$ | $a'_1$ |
| 5 | $a'_4+a'_2+a'_1$ | $a'_3+a'_1$ | $a'_2$ |
| 6 | $a'_5+a'_3+a'_2+a'_1$ | $a'_4+a'_2+a'_1$ | $a_3+a'_1$ |
| 7 | $a'_6+a'_4+a'_3+a'_2$ | $a'_5+a'_3+a'_2+a'_1$ | $a'_4+a'_2+a'_1$ |
| 8 | $a'_7+a'_5+a'_4+a'_3$ | $a'_6+a'_4+a'_3+a'_2$ | $a'_5+a'_3+a'_2+a'_1$ |

At this time the shift register 48 will be emitting $a'_1$ to the modulo 2 adder 49, and it is seen that if there is an error in $a'_1$ the pattern in the shift register 46 will be 001 since $a'_5+a'_3+a'_2+a'_1$ will be non-zero and correction will be effected in adder 49. It will readily be verified that if there is an error in any one of the digits $a'_2$ to $a'_7$, when that digit is being emitted by register 48 the error pattern in register 46 is 001, since at step 8 in the table above, the following patterns may be present:

| | |
|---|---|
| Error in $a_7$ gives an error pattern | 1 0 0 |
| Error in $a_6$ gives an error pattern | 0 1 0 |
| Error in $a_5$ gives an error pattern | 1 0 1 |
| Error in $a_4$ gives an error pattern | 1 1 0 |
| Error in $a_3$ gives an error pattern | 1 1 1 |
| Error in $a_2$ gives an error pattern | 0 1 1 |
| Error in $a_1$ gives an error pattern | 0 0 1 |

which sequence is stepped through the register 46 in synchronism with the emission of the digits from register 48.

Figure 10:
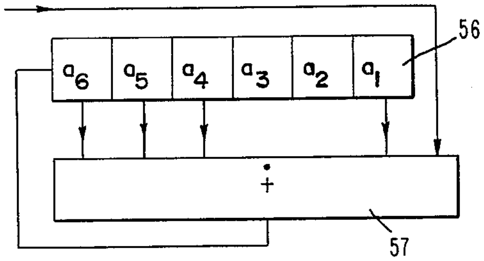
FIG. 10 shows an error-pattern forming portion of a decoder arranged to correct single, double adjacent, double separated by one, and triple errors.

FIGURE 10 shows the error-pattern forming portion of a decoder arranged to correct single, double adjacent, double separated by one, and triple errors, i.e. errors of the form 1, 11, 101, 111, in a word of length 15. A suitable characteristic equation is given by $$(T^2+T+1)(T^4+T^3+1)$$

which, when expanded becomes $$T^6+2T^5+2T^4+T^3+T^2+T+1$$

The C coefficients, expressed modulo 2, are $$C_1=1 \quad C_2=1 \quad C_3=1$$
$$C_4=0 \quad C_5=0$$

and so the shift register, which will have six stages, will have its first, second, third and sixth stages coupled to the modulo 2 adder as shown in FIGURE 10.

The decoder will have in addition a 15 stage shifting register, a further modulo 2 adder and an error pattern detector arranged similarly to the register 48, adder 49, and the detector 50 of FIGURE 9. Error indicating patterns to be detected are those of the form 000001
000011
000101
000111 and it may easily be verified that the arrangement of FIGURE 10 produces such patterns when the appropriate errors occur, for if the action of the fed back shifting register is followed in the manner applied to the decoder of FIGURE 9, it will be seen that after all the information digits have been entered into the 15-stage register, the fed back register contains $a_{10}+a_9+a_6+a_5+a_4+a_1$—Last stage
$a_{11}+a_{10}+a_7+a_6+a_5+a_2$—5th stage
$a_{12}+a_{11}+a_8+a_7+a_6+a_3$—4th stage
$a_{13}+a_{12}+a_9+a_8+a_7+a_4$—3rd stage
$a_{14}+a_{13}+a_{10}+a_9+a_8+a_5$—2nd stage
$a_{15}+a_{14}+a_{11}+a_{10}+a_9+a_6$—First stage so that according to the type of error occurring a pattern will be developed in the fed-back shifting register to initiate one of four sequences at a point which ensures that when the erroneous digit or digits are emitted, a correction pulse is delivered. The four sequences are shown as follows:

Error in:

| | |
|---|---|
| $a_{15}$ | 1 0 0 0 0 0 |
| $a_{14}$ | 1 1 0 0 0 0 |
| $a_{13}$ | 0 1 1 0 0 0 |
| $a_{12}$ | 0 0 1 1 0 0 |
| $a_{11}$ | 1 0 0 1 1 0 |
| $a_{10}$ | 1 1 0 0 1 1 |
| $a_9$ | 1 1 1 0 0 1 |
| $a_8$ | 0 1 1 1 0 0 |
| $a_7$ | 0 0 1 1 1 0 |
| $a_6$ | 1 0 0 1 1 1 |
| $a_5$ | 0 1 0 0 1 1 |
| $a_4$ | 0 0 1 0 0 1 |
| $a_3$ | 0 0 0 1 0 0 |
| $a_2$ | 0 0 0 0 1 0 |
| $a_1$ | 0 0 0 0 0 1 |

Error in:

| | |
|---|---|
| $a_{15}$ and $a_{14}$ | 0 1 0 0 0 0 |
| $a_{14}$ and $a_{13}$ | 1 0 1 0 0 0 |
| $a_{13}$ and $a_{12}$ | 0 1 0 1 0 0 |
| $a_{12}$ and $a_{11}$ | 1 0 1 0 1 0 |
| $a_{11}$ and $a_{10}$ | 0 1 0 1 0 1 |
| $a_{10}$ and $a_9$ | 0 0 1 0 1 0 |
| $a_9$ and $a_8$ | 1 0 0 1 0 1 |
| $a_8$ and $a_7$ | 0 1 0 0 1 0 |
| $a_7$ and $a_6$ | 1 0 1 0 0 1 |
| $a_6$ and $a_5$ | 1 1 0 1 0 0 |
| $a_5$ and $a_4$ | 0 1 1 0 1 0 |
| $a_4$ and $a_3$ | 0 0 1 1 0 1 |
| $a_3$ and $a_2$ | 0 0 0 1 1 0 |
| $a_2$ and $a_1$ | 0 0 0 0 1 1 |

Error in:

| | |
|---|---|
| $a_{15}$ and $a_{13}$ | 1 1 1 0 0 0 |
| $a_{14}$ and $a_{12}$ | 1 1 1 1 0 0 |
| $a_{13}$ and $a_{11}$ | 1 1 1 1 1 0 |
| $a_{12}$ and $a_{10}$ | 1 1 1 1 1 1 |
| $a_{11}$ and $a_9$ | 0 1 1 1 1 1 |
| $a_{10}$ and $a_8$ | 1 0 1 1 1 1 |
| $a_9$ and $a_7$ | 1 1 0 1 1 1 |
| $a_8$ and $a_6$ | 1 1 1 0 1 1 |
| $a_7$ and $a_5$ | 0 1 1 1 0 1 |
| $a_6$ and $a_4$ | 1 0 1 1 1 0 |
| $a_5$ and $a_3$ | 0 1 0 1 1 1 |
| $a_4$ and $a_2$ | 0 0 1 0 1 1 |
| $a_3$ and $a_1$ | 0 0 0 1 0 1 |

Error in:

| | |
|---|---|
| $a_{15}, a_{14}, a_{13}$ | 0 0 1 0 0 0 |
| $a_{14}, a_{13}, a_{12}$ | 1 0 0 1 0 0 |
| $a_{13}, a_{12}, a_{11}$ | 1 1 0 0 1 0 |
| $a_{12}, a_{11}, a_{10}$ | 0 1 1 0 0 1 |
| $a_{11}, a_{10}, a_9$ | 1 0 1 1 0 0 |
| $a_{10}, a_9, a_8$ | 0 1 0 1 1 0 |
| $a_9, a_8, a_7$ | 1 0 1 0 1 1 |
| $a_8, a_7, a_6$ | 1 1 0 1 0 1 |
| $a_7, a_6, a_5$ | 1 1 1 0 1 0 |
| $a_6, a_5, a_4$ | 1 1 1 1 0 1 |
| $a_5, a_4, a_3$ | 0 1 1 1 1 0 |
| $a_4, a_3, a_2$ | 0 0 1 1 1 1 |
| $a_3, a_2, a_1$ | 0 0 0 1 1 1 |

Figure 5:
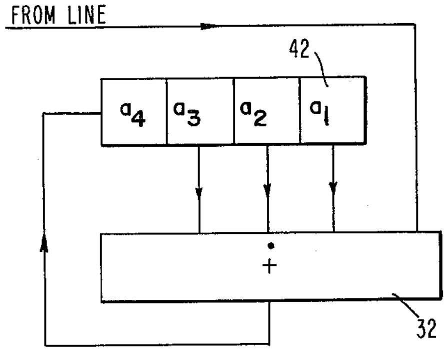
FIG. 5 shows a particular feedback register of the kind shown in FIG. 4.

FIGURE 5 shows the relevant portions a decoder embodying the present invention applied to a simple code of 7 characters, four check and three information, expressed by the characteristic equation $$(T+1)(T^3+T^2+1)=0$$

The C coefficients, derived as above, are $C_1=0$, $C_2=1$ and $C_3=1$, giving the connections shown in FIGURE 5.

It will be seen that the register takes the following sequence of values:

| | | | | |
|---|---|---|---|---|
| 1 | 0 | 0 | 0 | 0 |
| 2 | $a_{1'}$ | 0 | 0 | 0 |
| 3 | $a_{2'}$ | $a_{1'}$ | 0 | 0 |
| 4 | $a_{1'}+a_{3'}$ | $a_{2'}$ | $a_{1'}$ | 0 |
| 5 | $a_{1'}+a_{2'}+a_{4'}$ | $a_{1'}+a'_{3'}$ | $a_{2'}$ | $a_{1'}$ |
| 6 | $a_{2'}+a_{3'}+a_{5'}$ | $a_{1'}+a'_{2'}+a_{4'}$ | $a_{1'}+a_{3'}$ | $a_{2'}$ |
| 7 | $a_{3'}+a_{4'}+a_{6'}$ | $a_{2'}+a'_{3'}+a_{5'}$ | $a_{1'}+a_{2'}+a_{4'}$ | $a_{1'}+a_{3'}$ |
| 8 | $a_{4'}+a_{5'}+a_{7'}$ | $a_{3'}+a'_{4'}+a_{6'}$ | $a_{2'}+a_{3'}+a_{5'}$ | $a_{1'}+a_{2'}+a_{4'}$ |
| = | z4 | z3 | z2 | z1 |

As has been mentioned earlier, if maximum speed of transmission is required, it is necessary to duplicate the fed back shifting registers and operate them in tandem. In the case of the decoder of FIGURE 5, such duplication would show little economy over the first arrangement. In the other decoders described, however, considerable economies are shown.

The techniques described above may be applied to an encoder, and an encoder for implementing the code used in the decoder of FIGURE 5 is shown in FIGURE 8. It will be seen that the circuit is essentially the same as that of the basic elements of the decoder, with the addition of a pair of switches $S_1$ and $S_2$.

If it is assumed that the information digits are $a_1$, $a_2$, and $a_3$, then with switches $S_1$ and $S_2$ initially in the positions shown, the contents of the register are successively

| | | | | |
|---|---|---|---|---|
| 1 | 0 | 0 | 0 | 0 |
| 2 | $a_1$ | 0 | 0 | 0 |
| 3 | $a_2$ | 0 | 0 | 0 |
| 4 | $a_1+a_3$ | $a_2$ | $a_1$ | 0 |

At this point $S_1$ and $S_2$ are changed over to the positions shown in dotted lines

| | | | | |
|---|---|---|---|---|
| 5 | 0 | $a_1+a_3$ | $a_2$ | $a_1$ |
| 6 | 0 | 0 | $a_1+a_3$ | $a_2$ |
| 7 | 0 | 0 | 0 | $a_1+a_3$ |

The output fed to line after changing over $S_1$ and $S_2$ is thus $$a_1+a_2(=a_4);\ a_2+a_3(=a_5);\ a_1+a_2+a_3(=a_6);\ a_1+a_3(=a_7)$$

which are the check digits required by the code.

Figure 11:
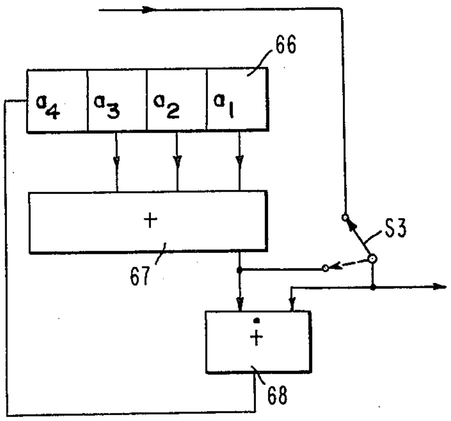
FIG. 11 shows an alternative encoder wherein the adder is split into two parts with a single switch $S_3$.

An alternative encoder is shown in FIGURE 11. Here the adder has been split into two parts, enabling the switches $S_1$ and $S_2$ to be replaced by a single switch $S_3$.

Techniques for decoding and encoding have been described above with reference to binary fields, i.e., messages made up of characters which can take one of only two values. However, it will be appreciated by those skilled in the art that characters taking $p^q$ values, where $p$ is prime may be handled by similar techniques. If $q=1$, the elements of the shift registers will have $p$ stable states, arithmetic will be performed modulo $p$, instead of modulo 2, and multiplications may be necessary in the feedback connections of the shifting register. When $q$ is greater than 1, the arithmetic involved is not simply modulo $p$ arithmetic, but arithmetic in the appropriate Galois field. In particular the implementation of codes is possible where the digits take $2^q$ different values, which leads to the possibility of correcting errors in binary messages that are transmitted $q$ digits at a time. A simple example of such a code is the one which has message length 5, information length 3 and whose digits take 4 values. This code can correct any error in a single digit, and the basic shifting register is shown in FIGURE 4. The circle indicates multiplication by the Galois Field element $b$, and the field is such that $$b^2+b+1=0$$

Figure 12:
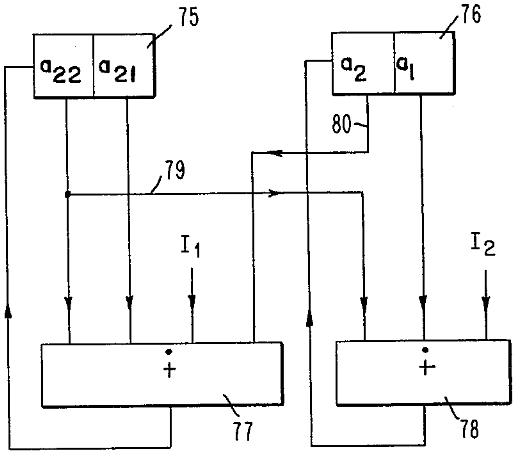
FIG. 12 shows a practical circuit where the four stages are composed of two pairs of dual-state stages.

The adder indicates addition in the Field, and the shift register stages have four stable states. A convenient practical form of circuit is shown in FIGURE 12, where the four state stages are made up of 2 pairs of 2-state stages.

While the invention has been particularly shown and described with references to preferred embodiments thereof, it will be understood by those skilled in the art that various changes in form and details may be made therein without departing from the spirit and scope of the invention.

What is claimed is:

1. An error correcting data transmission device including an encoder for developing binary check digits from a series of binary data digits to be transmitted, said encoder comprising a shift register connected to receive said data digits serially, said shift register having a number of stages sufficient to receive the data digits, a modulo two adder associated with said shift register and connected to receive a plurality of inputs and to deliver a single output representing the modulo two sum of said inputs to said shifting register, said adder delivery being by feedback means with a gating means, said gating means being open during serial data digit entry and closed for feedback delivery of developed check digit entries into said shift register, and coupling means for selectively and individually coupling the inputs of said adder with selected stages of said shift register in accordance with a selected checking code.

2. An error correcting data transmission device including an encoder for developing binary check digits from a series of binary data digits to be transmitted, said encoder comprising a shift register connected to receive said data digits serially, said shift register having a number of stages equal to the number of check digits to be developed, a modulo two adder associated with said shift register and connected to receive a plurality of inputs and to deliver a single output representing the modulo two sum of said inputs to said shifting register, said adder delivery being by direct feedback means to said shift register, said register stages being gated to individual flip flops wherein said check digits are formed, output gating means for said flip flops, and coupling means for selectively and individually coupling the inputs of said adder with selected stages of said shift register in accordance with a selected checking code.

3. An encoder correcting data transmission device including a decoder for receiving transmitted binary data digits and binary check digits, said decoder comprising a shift register connected to receive both data digits and check digits serially, adding means connected to said shift register to develop a modulo two sum of digits appearing in selected stages of said shift register, detecting means responsive to successive values of said sum and the values of data digits received, and inverting means connected to receive the output of said shift register and to invert a digit output whenever said detecting means detects an error.

4. A data transmission decoder of the kind set forth in claim 3 wherein said detecting means includes a second shift register and a modulo two adder wherein are developed and stored combined sums of selected combinations of data and check digits, also including an error pattern sensing means for sensing an error pattern and emitting an inverting pulse whenever such an error pattern is detected in a series of such sensings concommittant with serial data output.

5. An error burst correcting data transmitting decoder comprising a buffer register for receiving a series of binary code pulses including data pulses and check pulses, an error pattern shift register, input means common to said buffer and pattern registers, gating means including exclusive "or" connections between said buffer register and said error register, output means including exclusive "or" connections between said buffer register and said error register, detecting means for affecting buffer output pulses by pattern register pulses, means in said detecting means for detecting a mismatch of pulses one step before the output of an error pulse from the buffer, and error correcting means under control of said detecting means and said error pattern register for correcting said error pulse, whereby data pulses are corrected during continuous data transmission.

6. An error burst correcting data transmitting encoder and decoder comprising a register for receiving a series of binary code pulses including data pulses and check pulses, an error pattern shift register, input means leading directly to gating means including exclusive "or" connections between said input and said error register, output means including exclusive "or" connections to said error register, detecting means for affecting output pulses according to pattern register pulses, means in said detecting means and said register for detecting a mismatch of pulses one step before the output of an error pulse from the register, and error correcting means under control of said detecting means and said error pattern register for correcting said error pulse, whereby data pulses are corrected during data transmission.

7. An error correcting data transmission device including an encoder for developing binary check digits from a series of transmitted binary data digits, said encoder comprising a modulo two adder connected to receive said data digits serially and to form modulo two sums of inputs, a shift register connected to said modulo two adder to receive said sums as inputs, coupling means for selectively and individually coupling the inputs of said adder with selected stages of said register in accordance with a selected checking code, and means for selectively connecting a transmission line to the adder and the register, said connecting means including a switch between the line and the input of the adder and a second switch between the output of the adder and the register and the line.

8. An error correcting data transmission device including an encoder for developing binary check digits from a series of transmitted binary data digits, said encoder comprising a modulo two adder connected to receive said data digits serially and to form modulo two sums of inputs, a shift register connected to said modulo two adder to receive said sums as input, coupling means for selectively and individually coupling the inputs of said adder with selected stages of said register in accordance with a selected checking code, means for selectively connecting a transmission line to the adder and the register, said connecting means including a switch, and a second modulo two device connected between said switch and said adder, said switch either connecting an input line to the adder or the adder to an output line.

9. In an error burst data correction transmission device of the kind for developing serial binary check digits from serial binary data digits by use of feed back shift registers in conjunction with modulo two adders, the contents of said register being noted in matrix terms where T is a $k \times k$ matrix all of the elements being 0 or 1, and represented by the $k \times 1$ vector $x$, and a register equation with $2^k-1$ different values is characterized as $M(k\underline{T})=0$ and since in each data block there are $n-k$ data digits and $k$ check digits and successive digits are $a_1 \ldots a_n$, the class of code equation is defined as $$a_1\underline{x}+a_2\underline{T}\underline{x}+a_3\underline{T}^2\underline{x}+ \ldots a_n\underline{T}^{n-1}\underline{x}=0$$

which are taken to be check digits, and a total parity check equation is added with $k_1$ and $k_2$ such that $2^{k_2}-1$ is a factor of $2^k-1$ an extended matrix code has the characteristic equation $M_1(k_1\underline{T})M_2(k_2\underline{T})=0$, the provision of a decoder comprising a shift register connected to receive binary digits serially, an adding means connected to said shift register to develop modulo two sums of digits appearing in selected stages of said shift register, detecting means responsive to successive values of said sums, and inverting means under control of said detecting means and connected to receive the output of said shift register and to invert a digit output whenever said detecting means detects an error.

10. A device of the kind set forth in claim 9 wherein a selected matrix code has the characteristic equation $(T^{k_1}+1)M(k_2\underline{T})=0$ when $k_1$ is chosen to be prime to $2^{k_2}-1$ and $n=k_1(2^{k_2}-1)$; and coupling means selectively coupling the inputs of the adder with selected stages of the register in accordance with the selected matrix code.

11. In a device of the kind set forth in claim 9 for causing error correction of a code having the general matrix characteristic equation $$T^k+C_{k-1}\underline{T}^{k-1}+C_{k-2}\underline{T}^{k-2}+ \ldots +C_1\underline{T}+C_0=0$$

and the provision of coupling means between the register stages and the adding means such as to be in accordance with the selected code.

12. An error correcting data transmission device including an encoder for developing check digits from a series of data digits transmitted in parallel, said encoder comprising a plurality of modulo two adders connected to receive data digits in parallel and to form modulo two sums of inputs, a plurality of shift registers connected to said adders to receive said sums as inputs, and coupling means for coupling the inputs of said adders to stages of said registers in accordance with a checking code.

13. A device of the kind set forth in claim 12 wherein each adder is related to a register and said coupling means includes connections from an adder to a stage of an unrelated register.

14. An error burst correcting data transmission device including a decoder for developing error pattern correction digits from data digits and check digits transmitted thereto, said decoder comprising a pair of shift registers, four "exclusive OR" devices, an error pattern detector, coupling means and gating means, one of said registers acting as a buffer with coupling to the first "OR" device which has an output gated to either the second shift register or the second "OR" device coupled thereto to form error pattern settings for said detector, said detector having feed back connections to said second shift register through the third "OR" device, and the fourth "OR" device being situated between the outputs of the buffer register and the detector to correct erroneous emitted digits.

15. In combination with an information handling system having a source of binary coded multi-bit data signals and a device for utilizing said signals, an error correcting system interconnecting said data source and said utilization device operable to detect, locate and correct a plurality of different types of related errors occurring during the translation of said data signals to said device, said correcting system including an encoder, a decoder and signal translating means connected therebetween, said encoder comprising a shift register and means for supplying to said signal translating means a code group signal consisting of a predetermined number of data bits, and a predetermined number of check bits, said supplying means including means for generating said check bits from bit positions determined by pulse emission from said register, said decoder comprising a second shift register and means for generating error correction bits from said code group signals as received over bit positions determined by pulse emission from said second register, and means under the control of said generated error corrected bits operable to correct any one of said different types of related errors prior to supplying an erroneous data bit to said utilization device.

16. A data transmission system adapted to develop $k$ check digits from a group of serially presented information digits, each of which may take one of $p^q$ values, $p$ being prime, in accordance with a code specified by a characteristic equation of the form $$\underline{T}^k+C_{k-1}\underline{T}^{k-1}+C_{k-2}\underline{T}^{k-2}+ \ldots +C_1\underline{T}+C_0=0$$

where $\underline{T}$ is a $k \times k$ matrix and the coefficients C belong to a field of $p^q$ elements, comprising a shifting register having $k$ stages designated $k-1$ to 0 and arranged to shift in synchronism with the presentation of said information digits and an adder arranged to receive said information digits in succession and to deliver after each shift to stage $k-1$ of said shifting register the sum of the currently occurring information digit with the contents of the $k$ stages each multiplied by the C coefficient bearing a suffix the same as the designation of the stage, the development of the sums and the multiplication being effected in accordance with arithmetic rules obtaining in the field to which the C coefficients belong.

17. A system as claimed in claim 16, for handling information digits expressed in the binary field, so that the coefficients C take only the values 0 or 1, in which said adder is adapted to deliver to stage $k-1$ of the shifting register the modulo-2 sum of the contents of only those stages whose designation corresponds to the suffix of a non-zero C coefficient.

18. A data transmission system adapted to develop error indicating digit patterns from a group of serially presented information and check digits, each of which may take one of $p^q$ values, $p$ being prime, in accordance with a code specified by a characteristic equation of the form $$\underline{T}^k+C_{k-1}\underline{T}^{k-1}+C_{k-2}\underline{T}^{k-2}+ \ldots +C_1\underline{T}+C_0=0$$

where $\underline{T}$ is a $k \times k$ matrix and the coefficients C belong to a field of $p^q$ elements, comprising a shifting register having $k$ stages designated $k-1$ to 0 and arranged to shift in synchronism with the presentation of said digits and an adder arranged to receive said digits in succession and to deliver to stage $k-1$ of said shifting register after each shift the sum of the currently occurring digit with the contents of the $k$ stages each multiplied by the coefficient C bearing a suffix the same as the designation of the stage, the development of the sum and the multiplication of said contents being effected in accordance with arithmetic rules obtaining in the field to which the C coefficients belong.

19. A system as claimed in claim 18 including delay means adapted to receive said group of digits and to present them successively at an output device a predetermined period after their receipt and an error pattern detector arranged to monitor the contents of said shifting register and to deliver error indicating signals to said output device and to said adder whenever an error indicating digit pattern is detected.

20. A system as claimed in claim 19, wherein said delay means is a further shifting register adapted to accommodate said group of information and check digits.

21. A system as claimed in claim 20 for detecting errors occurring in bursts of length $x$ digits, in which said adder is in three parts, a first part arranged to receive inputs from stages $k-1$ to $x$ of said shifting register, a second part to receive inputs from stages $x-1$ to 0, and the third part to sum the contents of said first and second parts, said error pattern detector comprising an OR circuit connected to monitor the contents of stages $k-1$ to $x$ of said shifting register and an AND circuit connected to receive the output of said OR circuit and the output of said second part of the adder.

22. A system as claimed in claim 21 for handling information and check digits expressed in the binary field so that said C coefficients may take only the values 0 or 1, in which said adder is adapted to deliver to stage $k-1$ of the shifting register the modulo-2 sum of the contents of only those stages whose designation corresponds to a non-zero C coefficient.

23. A system as claimed in claim 22 in which said output device is a modulo-2 adder connected to receive the output of said delay means for addition to the output of said error pattern detector.

24. A data transmission system adapted to develop $k$ binary check digits from a group of serially presented binary information digits in accordance with a code specified by a characteristic equation $$\underline{T}^k+C_{k-1}\underline{T}^{k-1}+\ .\ .\ .\ +C_1\underline{T}+C_0=0$$

where $\underline{T}$ is a $k\times k$ matrix and the coefficients C take the values 0 or 1, comprising a fed-back shifting register having $k$ stages designated $k-1$ to 0 arranged to shift in synchronism with the presentation of said information digits, the feedback path of said fed-back shifting register including a modulo-2 adder connected to receive inputs only from those stages whose designation corresponds to the suffix of a non-zero C coefficient, and a system of gates, one associated with each stage of the shifting register and arranged to present the contents of their associated stages sequentially after presentation of said information digits.

25. A data transmission system adapted to develop $k$ binary check digits $a_{n-k+1}$ to $a_n$ from a group of $n-k$ sequentially presented information digits $a_1$ to $a_{n-k}$ in accordance with a series of parity equations, of which the first is $$\sum_{i=1}^{n} a_i b_i=0$$

defined by a code specified by characteristic equation $$\underline{T}^k+C_{k-1}\underline{T}^{k-1}+C_{k-2}\underline{T}^{k-2}+\ .\ .\ .\ C_1\underline{T}+C_0=0$$

where $\underline{T}$ is a $k\times k$ matrix and the coefficients C take the values 0 or 1, comprising a shifting register adapted to shift in syncronism with the presentation of said information digits and having $n-k$ stages designated $n-k$ to 1, a modulo-2 adder arranged to receive inputs from only those stages of the shifting register whose designation corresponds to that of a non-zero $b$ coefficient in said first parity equation, and switching means arranged first to apply said information digits and subsequently the output of said modulo-2 adder to stage $n-k$ of said shifting register.

26. A data transmission system for detecting and correcting specified errors in a sequence of $n-k$ binary information digits $a'_1$ to $a'_{n-k}$ followed by $k$ binary check digits $a'_{n-k+1}$ to $a'_n$, said check digits having been developed from said information digits in accordance with a series of parity equations, the first of which is $$\sum_{i=1}^{n} a_i b_i=0$$

defined by a code specified by a characteristic equation $$\underline{T}^k+C_{k-1}\underline{T}^{k-1}+C_{k-2}\underline{T}^{k-2}+\ .\ .\ .\ +C_1\underline{T}+C_0=0$$

where $\underline{T}$ is a $k\times k$ matrix and the coefficients C take the values 0 or 1, comprising an input shifting register having $n$ stages designated $a_n$ to $a_1$ and connected to receive said information and check digits, a modulo-2 adder connected to receive inputs from only those stages of said input shifting register whose designation corresponds to that of a non-zero $b$ coefficient in said first parity equation, an error pattern shifting register having $k$ stages designated $k$ to 1 and connected to the output of said modulo-2 adder, and a further modulo-2 adder connected to deliver to stage $k$ of said error pattern shifting register the modulo-2 sum of the contents of those stages of the error pattern shifting register whose designation corresponds to that of a non-zero C coefficient in said characteristic equation, an error-pattern detector adapted to monitor the contents of the stages of said error pattern shifting register and to deliver to said further modulo-2 adder a binary one output whenever a pattern indicating one of the specified errors is detected, and an error correcting circuit connected to said input shifting register and responsive to an output from said error-pattern detector to modify a predetermined information digit.

27. A system as claimed in claim 26 in which said error correcting circuit is a modulo-2 adder connected to develop the sum of the output of said error pattern detector with the output of said input shifting register.

References Cited in the file of this patent

UNITED STATES PATENTS 2,956,124 Hagelbarger ............ Oct. 11, 1960

OTHER REFERENCES

Hamming, R. W.: Error Detecting and Error Correcting Codes; Bell System Technical Journal, vol. 29, No. 2 April 1950.

Elian, Peter: Coding for Noisy Channels; IRE Convention Record 1955, Part 4, pp. 37–46.

Green, J. H., and San Soucie, R. L.: An Error-Correcting Encoder and Decoder of High Efficiency; Proceedings of the IRE, October 1958, pages 1741–1744.

Feinstein, A.: Foundations of Information Theory; McGraw-Hill, New York, 1958, pages 120–131.

Green, J. H., and Gordon, J: A Digital Selective Signalling System for Mobile Radio; IRE Transactions on Vehicular Communications, April 1959, pages 74–85.

UNITED STATES PATENT OFFICE

CERTIFICATE OF CORRECTION

Patent No. 3,162,837

December 22, 1964

John E. Meggitt

It is hereby certified that error appears in the above numbered patent requiring correction and that the said Letters Patent should read as corrected below.

Column 8, lines 40 to 43, for that portion of the formula reading:

$=(q_2+q_r\underline{T}+$ read $=(q_2+q_3\underline{T}+$ same column 8, line 64, for "$Z_1=1\dotplus 0\dotplus 1=1$" read --$Z_1=1\dotplus 0\dotplus 1=0$ --.

Signed and sealed this 26th day of October 1965.

(SEAL)

Attest:

ERNEST W. SWIDER
Attesting Officer

EDWARD J. BRENNER
Commissioner of Patents